U S008251563B2

(12) United States Patent
Papakonstantinou et al.

(10) Patent No.: US 8,251,563 B2
(45) Date of Patent: Aug. 28, 2012

(54) POLARIZED DIFFRACTIVE BACKLIGHT

(75) Inventors: Ioannis Papakonstantinou, Oxon (GB); David James Montgomery, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 393 days.

(21) Appl. No.: 12/474,294

(22) Filed: May 29, 2009

(65) Prior Publication Data
US 2010/0302798 A1    Dec. 2, 2010

(51) Int. Cl.
 *F21V 7/04* (2006.01)
(52) U.S. Cl. .......... 362/619; 362/625; 362/97.1
(58) Field of Classification Search .......... 362/615, 362/617–620, 623–626, 97.1; 359/558, 566, 359/569
See application file for complete search history.

(56) References Cited

U.S. PATENT DOCUMENTS

| | | | |
|---|---|---|---|
| 5,162,943 A * | 11/1992 | Komatsu et al. | 359/571 |
| 5,258,871 A | 11/1993 | Gupta | |
| 5,650,865 A | 7/1997 | Smith | |
| 5,999,685 A * | 12/1999 | Goto et al. | 385/146 |
| 6,688,751 B2 | 2/2004 | Lee et al. | |
| 6,786,613 B2 | 9/2004 | Suzuki | |
| 7,018,061 B2 * | 3/2006 | Chen | 362/619 |
| 7,064,899 B2 * | 6/2006 | Te Kolste et al. | 359/569 |
| 7,430,076 B2 * | 9/2008 | Sato et al. | 359/569 |
| 7,699,482 B2 * | 4/2010 | Noguchi | 362/84 |
| 7,787,183 B2 * | 8/2010 | Te Kolste et al. | 359/569 |
| 2004/0169929 A1 * | 9/2004 | Sato et al. | 359/558 |
| 2004/0246743 A1 | 12/2004 | Lee et al. | |

FOREIGN PATENT DOCUMENTS

| | | |
|---|---|---|
| JP | 2001-343612 A | 12/2001 |
| JP | 2005-189264 A | 7/2005 |
| JP | 2006-114379 A | 4/2006 |
| JP | 2006-120484 A | 5/2006 |
| JP | 2006-294361 A | 10/2006 |

OTHER PUBLICATIONS

M. Xu, H. P. Urbach and D. K. G. deBoer, "Simulations of birefringent gratings as polarizing color separator in backlight for flat-pnel displays", Opt. Express 15, 5789 (2007).
Office Action for corresponding Japanese Application No. 2010-107479 mailed Oct. 4, 2011.

* cited by examiner

*Primary Examiner* — Bao Q Truong
(74) *Attorney, Agent, or Firm* — Renner, Otto, Boisselle & Sklar, LLP

(57) ABSTRACT

A backlight is provided for illuminating an at least partially transmissive display. The backlight includes a light source. A light guide receives the light from an edge surface and guides the light by total internal reflection. The light is extracted from the lightguide using sub-wavelength extraction features designed on the basis of two interleaved grating structures. The emitted light, using this arrangement has a high level of polarization.

19 Claims, 12 Drawing Sheets

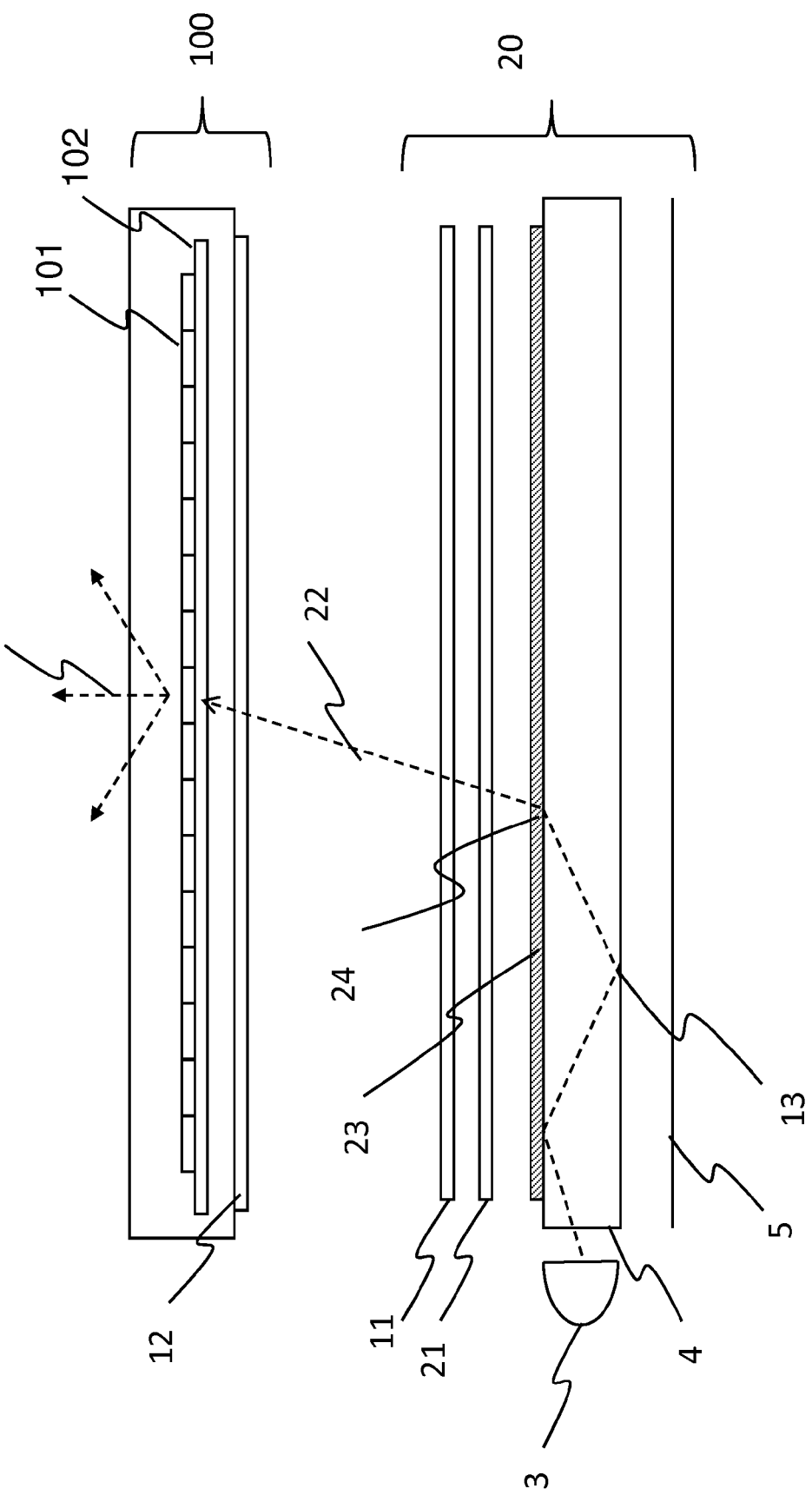

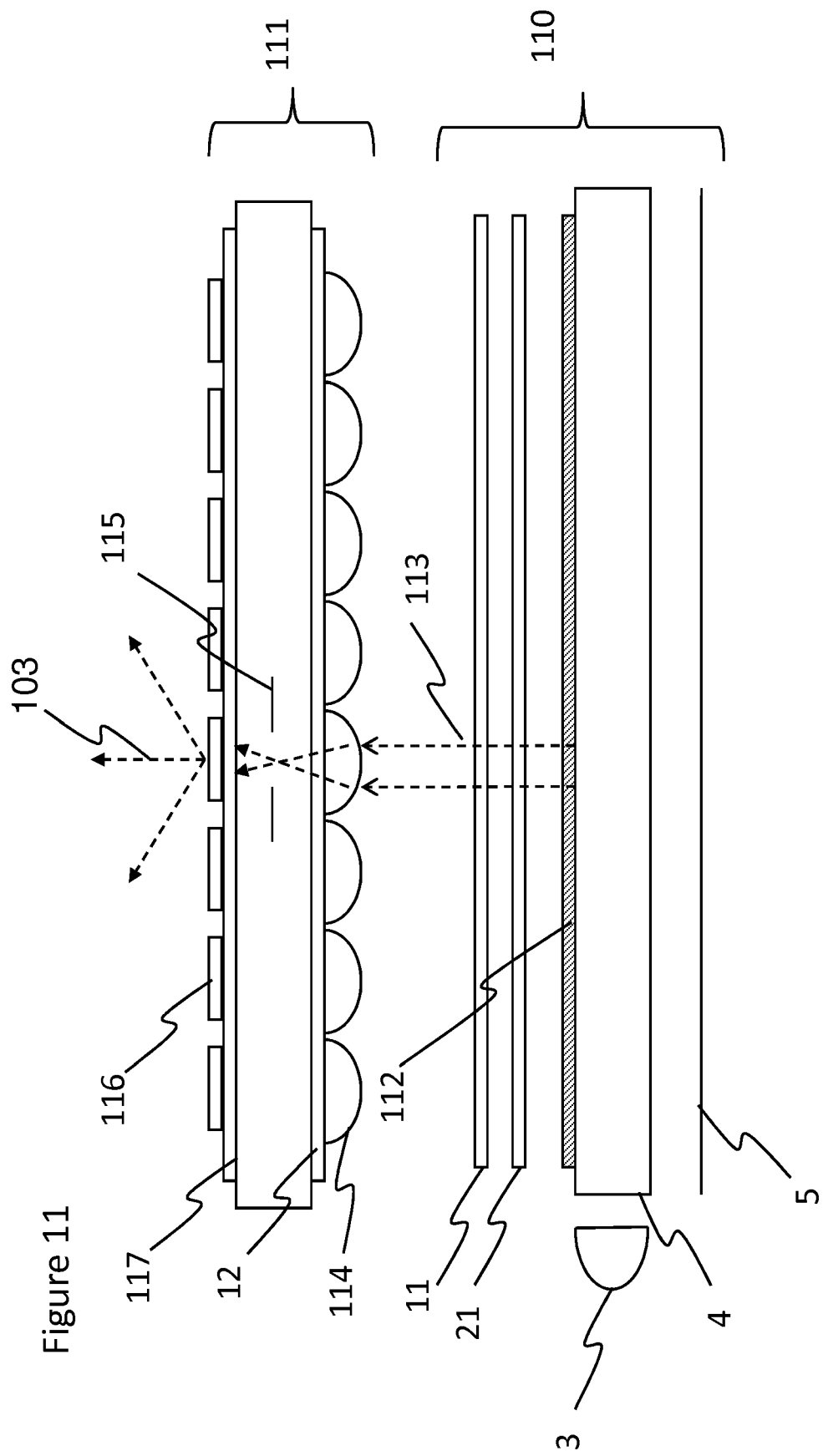

POLARIZED DIFFRACTIVE BACKLIGHT

TECHNICAL FIELD

The present invention relates to a backlight, for example for use with an at least partially transmissive spatial light modulator. The present invention also relates to a display including such a backlight. More particularly, the present invention relates to a distributed illumination panel that may be used for general illumination.

BACKGROUND OF THE INVENTION

FIG. 1 of the accompanying drawings illustrates the stack structure of a typical liquid crystal display (LCD) module of small size, for example for a mobile phone or PDA device. The display includes a flat transmissive spatial light modulator (SLM) in the form of an LCD panel having input and output polarizers on its bottom and top sides. The rest of the structure is generally regarded as the backlight system, as follows. A light source (for example an LED or Laser) emits light, which is coupled into a lightguide and distributed across the back of the display by way of total internal reflection (TIR) in such a way that if no scattering structures were present the light would travel until it reached the end of the lightguide. Within the lightguide there are multiple scattering structures that extract the light from the lightguide to illuminate the LCD panel by disrupting the TIR conditions at the surface of the lightguide on which they are located, hence allowing the light to pass through the air-lightguide interface. These scattering features may be located on either the top or bottom major lightguide surfaces. The density of the light scattering features may increase with distance from the light source to maintain a uniform rate of extraction of the light along the length of the lightguide. As light is extracted both down and up from the lightguide, a reflecting film is placed beneath the light guide to improve the efficiency of the backlight. There are also some optical films between the lightguide and the LCD panel, placed to give better illumination uniformity over the display area and to enhance brightness within a given viewing angle range. These films typically consist of diffuser layers and prism films that enhance the central brightness of the backlight. The form of these structures is well known in the art and will not be discussed further here.

The form of the features that extract light from the lightguide is the main focus of the present invention. The typical form of extraction features involves "roughening" of the surface in some manner to disrupt total internal reflection (TIR) in the lightguide. The extraction in this case produces light that is emitted at a high angle to the lightguide normal and it preserves no coherence or polarization of the light.

There are many types of extraction features that can control the angle of extraction, for example U.S. Pat. No. 6,786,613 (Minebea) describes wedge shaped extraction features that extract light in a more vertical direction, but none of these types creates a polarized emission from an unpolarized source.

The amount of polarization of any light source is measured by the ratio of the electric field intensity in two orthogonal directions. These directions are known as TE (transverse electric) and TM (transverse magnetic). The ratio of the electric field intensities is known as the TE/TM ratio and is a measure of the level of polarization of a beam.

Conventional art related to polarized emission from a lightguide guiding unpolarized light is described below.

The advantage of a polarized backlight is that there is potentially no loss in the polarizers on the display, this significantly increasing the brightness of the LC display without increasing the backlight brightness. A backlight that produces a TE/TM ratio of substantially greater than 100 would be as good as the polarizers of the display, making them unnecessary. A backlight with a lower TE/TM ratio would still improve the loss from the polarizers.

Polarization sensitive interference films ("DBEF") that reflect one polarization and transmit another are well known in the art. Commercially available versions typically produce a TE/TM ratio of approximately 3, limited by poor off-axis performance and absorption losses in the film.

US 2004/0246743 (Samsung Electronics Co.) describes a conventional rectangular grating printed on the bottom surface of a lightguide. The grating exhibits some polarization sensitivity by out-coupling more of the light belonging to one of the polarization states, with the polarization ratio of the transmitted field (TE/TM) depending on the amplitude (height) of the grating. However, polarization ratio TE/TM is not as high as "DBEF" films. Also, it works for limited angles of incidence and wavelengths.

U.S. Pat. No. 5,650,865 (Hughes Electronics) describes a holographic grating disposed on the top surface of a lightguide that transmits TE polarization and reflects TM. A phase retarding film deposited on the bottom lightguide surface gradually converts TM fields to TE, allowing for polarization recycling. Design is expensive and difficult to manufacture.

U.S. Pat. No. 6,688,751 (Slight Optoelectronics Co.) describes a backlight with a multilayer dielectric film deposited on its bottom surface. The dielectric film reflects light of one of the polarization states while it allows through the second state. Light reflected by the film is out-coupled from the lightguide while the polarization of the transmitted light is switched as it passes through a second film so that it can be reused. The design is expensive and very sensitive to the angle of incidence.

U.S. Pat. No. 5,258,871 (Eastman Kodak Company) describes a dual grating which allows for angular separation between TE and TM polarizations which are subsequently focused onto two different points. Design is aimed at projectors and not for panel LCDs.

M. Xu, H. P. Urbach and D. K. G. de Boer, "Simulations of birefringent gratings as polarizing color separator in backlight for flat-panel displays," Opt. Express 15, 5789 (2007), describes a grating made of birefringent material deposited on a lightguide which transmits TE polarization and reflects TM. The design exhibits low TE/TM ratio.

SUMMARY OF THE INVENTION

According to an aspect of the invention, a lightguide is provided for use in distributing light received from a light source. The lightguide may be part of a backlight assembly for a spatial light modular operating on a polarization basis. For example this could be a liquid crystal display (LCD). The backlight unit may include a reflecting assembly on the opposite face from the LCD and not in contact with the lightguide. The light source may be illuminating another face of the lightguide that may be much smaller in area than two major faces. A substantial part of the light is transmitted by total internal reflection across the lightguide. The lightguide includes at least one layer in substantial optical contact with adjacent layers. At least one face or interface between layers consists of a structure that, when combined, will out-couple preferentially one polarization over another.

The structure may include two square gratings interlaced on the surface, where one grating is substantially twice the spatial frequency of the other and both gratings have a substantially different feature width and height, with the higher frequency grating having the smaller feature width.

According to another aspect of this invention, another face of the lightguide or another interface layer that sees totally internally reflected light in the lightguide includes a quarter wave plate so that the light that passes through it has its plane of polarization rotated by 90 degrees.

In a yet further aspect of this invention, the reflector has a quarter wave plate on the surface between the reflecting surface and the lightguide, so that light passing through the quarter wave plate at near normal incidence has the plane of polarization rotated by 90 degrees after reflection from the reflector. The quarter wave plate on the reflector is not in contact with the lightguide The light source could be a LED, fluorescent tube or laser, for example.

In a further aspect to this invention, a lightguide is provided where one surface or interface layer contains a single grating structure (one or two dimensional, of any shape) that is constructed from layered birefringent material. External to this lightguide is also provided a lens array and patterned retarder layer so that the light leaving the top of the retarder layer is polarized.

According to an aspect of the invention, a lightguide for distributing light received from a light source is provided. The lightguide includes a lightguide substrate having first and second major faces and an edge face there between into which light from the light source is injected, the lightguide substrate being configured to transfer the light between the first and second major faces by total internal reflection; and an extraction feature structure on at least one of the first and second major faces of the lightguide substrate to extract the light from the lightguide substrate, the extraction feature structure including at least a first grating interleaved with a second grating, wherein a spatial frequency of the first grating is different than that of the second grating.

In accordance with another aspect, the extraction feature structure is configured to out-couple the light from the lightguide substrate preferentially one polarization over another.

According to another aspect, the spatial frequency of the first grating is substantially twice that of the second grating.

According to still another aspect, a feature height of the first grating is different than a feature height of the second grating.

In accordance with another aspect, the feature height of the second grating alters the height of the first grating.

According to another aspect, a feature width of the first grating is different than a feature width of the second grating.

In accordance with another aspect, the first and second gratings are configured such that for a first polarization, light emitted from the first grating interferes destructively with light emitted from the second grating and is reflected back into the lightguide substrate.

According to another aspect, for a second polarization different from the first polarization, light emitted from the first grating does not destructively interfere with light emitted from the second grating and light of the second polarization is out-coupled from the lightguide substrate.

According to yet another aspect, the at least the first grating and the second grating interleaved consists only of the first grating and the second grating interleaved.

In accordance with another aspect, the extraction feature structure further includes at least a third grating interleaved with the first and second gratings, wherein a spatial frequency of the third grating is an integer multiple of the spatial frequency of the first grating.

According to another aspect, the lightguide structure includes first and second layers with light from the light source being injected at the edge face into the first layer, the refractive index of the second layer is less than the refractive index of the first layer, the extraction feature structure is on the second layer, and the first layer includes non-diffractive extraction features that redirect light within the first layer into the second layer.

In accordance with another aspect, the lightguide structure includes greater than two layers, with at least one of the layers including the extraction feature structure and another of the layers including the non-diffractive extraction features.

According to still another aspect, the first major face including the extraction feature structure and the second major face includes a first quarter wave plate layer that rotates the phase of light incident thereon from within the lightguide structure without disrupting total internal reflection.

In yet another aspect, the lightguide further includes a second quarter wave plate layer adjacent to but not in optical contact with the first quarter wave plate layer for correcting polarization of light reflected back through the first quarter wave plate.

In accordance with another aspect, the first and second gratings comprise symmetric interleaving of at least two parallel square gratings.

According to another aspect, the first and second gratings are lenticular.

According to still another aspect, the first and second gratings are refractive gratings with no opaque surface areas.

According to another aspect, a lightguide for distributing light received from a light source is provided which includes a lightguide substrate having first and second major faces and an edge face therebetween into which light from the light source is injected, the lightguide substrate being configured to transfer the light between the first and second major faces by total internal reflection; an extraction feature structure on at least one of the first and second major faces of the lightguide substrate to extract the light from the lightguide substrate, the extraction feature structure including a birefringent diffractive layer which diffracts unpolarized light from the lightguide substrate at two different angles corresponding to respective first and second polarizations.

In accordance with still another aspect, the birefringent diffractive layer includes a lenticular square grating.

According to another aspect, the birefringent diffractive layer includes a square array of at least one of a birefringent, reactive mesogen or liquid crystal material.

In yet another aspect, the lightguide further includes a lens array and a patterned retarder, whereby the lens array is configured to direct the light of the first polarization through areas of the patterned retarder different from areas of the patterned retarder through which the lens array directs the light of the second polarization to provide light having uniform polarization.

According to another aspect, the lens array includes a lenticular lens, and the patterned retarder comprises lenticular strips of birefringent half wave layers that rotate a plane of polarization by ninety degrees.

According to another aspect, a backlight for a display device is provided which includes a lightguide as described herein and a light source for providing the light injected into the lightguide.

In accordance with another aspect, a backlight for a display device is provided which includes at least three lightguides described herein; a first-colored light source associated with a first lightguide of the three light guides; a second-colored light source associated with a second lightguide of the three light guides; and a third-colored light source associated with a third lightguide of the three light guides.

According to yet another aspect, a display device is provided which includes a backlight as described herein; and a spatial light modulator illuminated configured to be illuminated by the backlight.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 10 illustrates a variation of the embodiment of FIG. 9;

FIG. 11 illustrates a display device that includes a light guide in accordance with the invention.

DETAILED DESCRIPTION OF THE INVENTION

Figure 1:
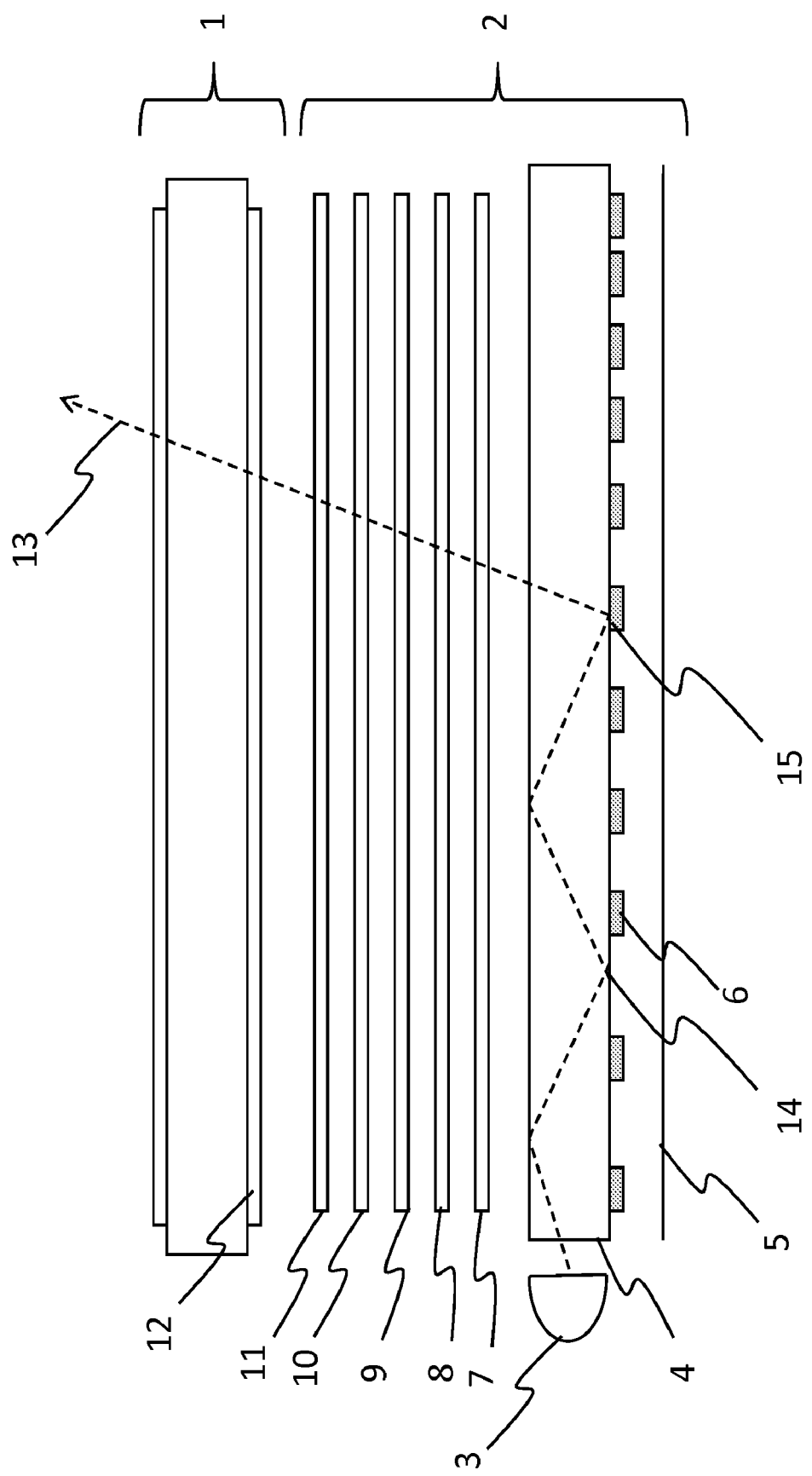
FIG. 1 illustrates a conventional backlight of known type.

The present invention will now be described in detail with reference to the drawings, in which like reference numerals are used to refer to like elements throughout.

FIG. 1 illustrates a typical small area liquid crystal display that is well known in the art. The display includes a liquid crystal display panel 1 and a backlight unit 2. The backlight unit 2 includes a number of components that are relevant to discuss here. A white light source 3, that can be a fluorescent tube, a LED with phosphor, RGB LED group, a laser or other light source, is positioned to inject light into the edge of a thin lightguide 4. The lightguide 4 is designed to transfer by total internal reflection (TIR) 14 the light across the area of the display. At least one large or major face, which can be the top, bottom (illustrated) or both major faces, has features 6 that disrupt TIR 15 in the lightguide 4 so that the light 13 leaves the lightguide 4. The light 13 that leaves the lightguide 4 generally has the wrong angular brightness characteristics for the display, so four additional layers, a strong diffuser 7, two crossed prism sheets 8 and 9 in orthogonal directions, and a weak diffuser 10 are used to produce the correct angular distribution. In many cases the weak diffuser 10 is incorporated into the top prism layer 9. A further layer 11 can be a polarization conversion film, which is typically an interference film that reflects one polarization and transmits the other. The reflected light is recycled through the diffusers to become unpolarized and is then reflected by a back reflector 5 to the film again. The result is that the light is polarized so that it is better transmitted by the rear polarizer 12 of the liquid crystal SLM 1. The efficiency of this interference film is limited, however.

Figure 2:
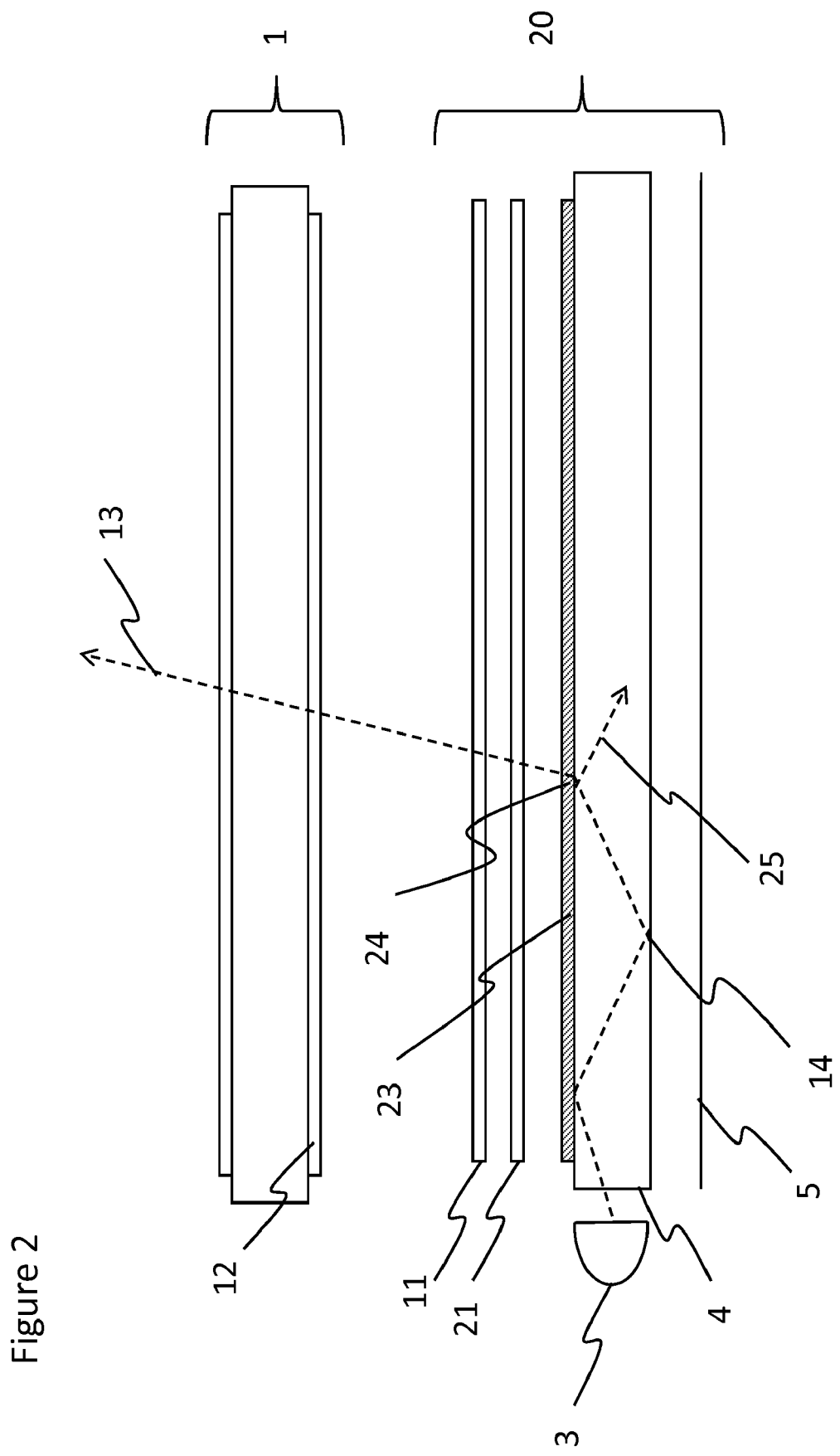
FIG. 2 illustrates an overview of a $1^{st}$ embodiment the present invention.

An overview of a first embodiment of the present invention is shown in FIG. 2.

The first embodiment of the present invention includes a backlight 20 that will be described in reference to the conventional backlight 2 of FIG. 1 and the relevant changes only will be described here.

As is shown in FIG. 2, the device in accordance with the invention includes a liquid crystal spatial light modulator (SLM) 1 and a backlight 20. The backlight includes a light source 3, a lightguide 4, and a reflector 5. Two sheets, a weak diffuser 21 and a polarization conversion film 11, are individually possible but not required in this arrangement. The lightguide 4 has sub-wavelength extraction features 23 that can be positioned on one or both major faces of the lightguide 4. In this example, the extraction features 23 are on the top surface.

Figure 3A:
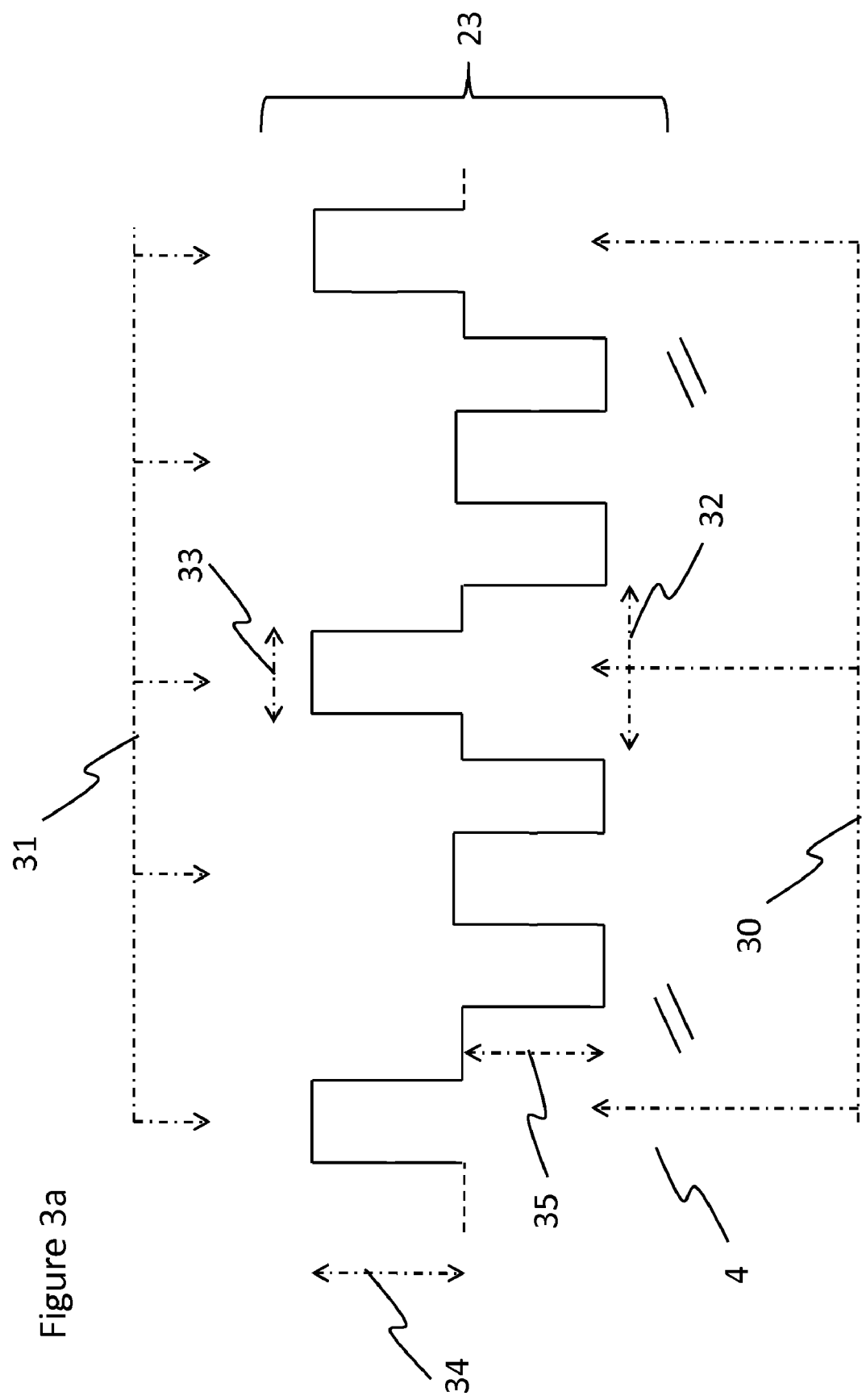
FIG. 3a illustrates the detail of the diffractive layer of the embodiment of FIG. 2.

Light 22 in the lightguide 4 is transmitted to the extraction features by TIR 14 and extracted at the surface 24 by the extraction features 23. The form of these extraction features 23 is shown in FIG. 3a. Specifically, the extraction features 23 are formed by two or more interleaved gratings. In the present embodiment, two respective gratings are lenticular and the cross section is shown in FIG. 3a. The gratings are arranged on the surface of the lightguide 4 so that the intensity of light emitted from the lightguide 4 is substantially the same over the display. This can be achieved by arranging the diffractive features into areas whose density or sizes alter with position on the lightguide. The extraction feature cross section includes the symmetrical interleaving of two parallel square gratings 30 and 31, one grating having a spatial frequency preferably exactly twice that of the other. The height 34, 35 and the peak width 32, 33 for the gratings 30 and 31, respectively, are different. The peak width 33 of the high spatial frequency grating 31 is less than the peak width 32 of the low spatial frequency grating 30.

This composite grating represented in FIG. 3a, when incident with light from a range of angles and polarizations that are typical in a light illuminated lightguide, emits light in the main diffractive order that is strongly polarized. The strength of polarization (TE/TM ratio) and width of the peaks depends on the conditions of the light illumination, but typically this will be light within the TIR cone of the lightguide 4. With a single lightguide 4 and a single wavelength light source 3 such as an LED, TE/TM ratios greater than 10 are readily possible.

The grating 23 has no opaque areas on the surface, and is simply a refractive grating.

The inventive concept of this invention primarily concerns the structure of the extraction features as shown in FIG. 3a. More specifically the design takes advantage of the intrinsic phase difference that occurs between TE and TM polarizations as they reflect on the upper and bottom interfaces in a lightguide, 4. The lenticular grating structure 23 is made from two different gratings, the second of which alters the height of the first grating. The effect of this is that the emitted field from one grating layer is in anti-phase from the field emitted from the second grating layer for one polarization. Therefore, light of the first polarization emanating from the two grating layers interferes destructively and since it cannot transmit through the grating it all reflects back to the lightguide, 25. However, due to the intrinsic phase difference between the two polarizations, interference cannot be destructive for the second polarization which is allowed to transmit through the grating leading to a well polarized beam out-coupled from the lightguide.

Figure 3C:
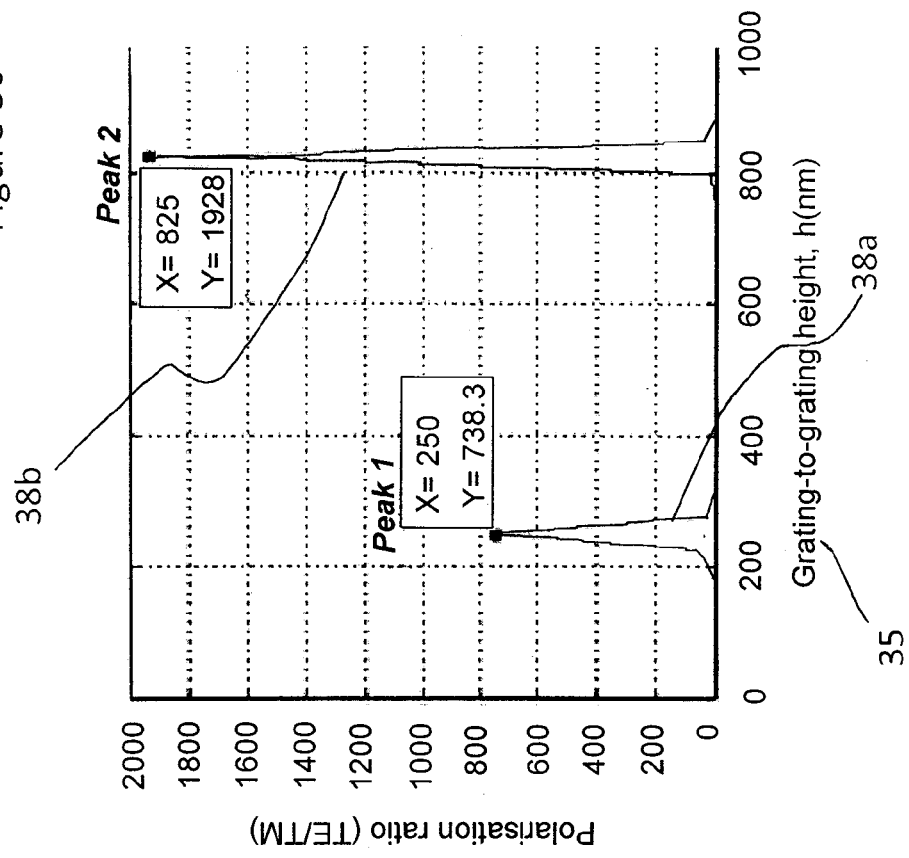
FIG. 3c is a graph showing the TE/TM ration as a function of height.
Figure 3B:
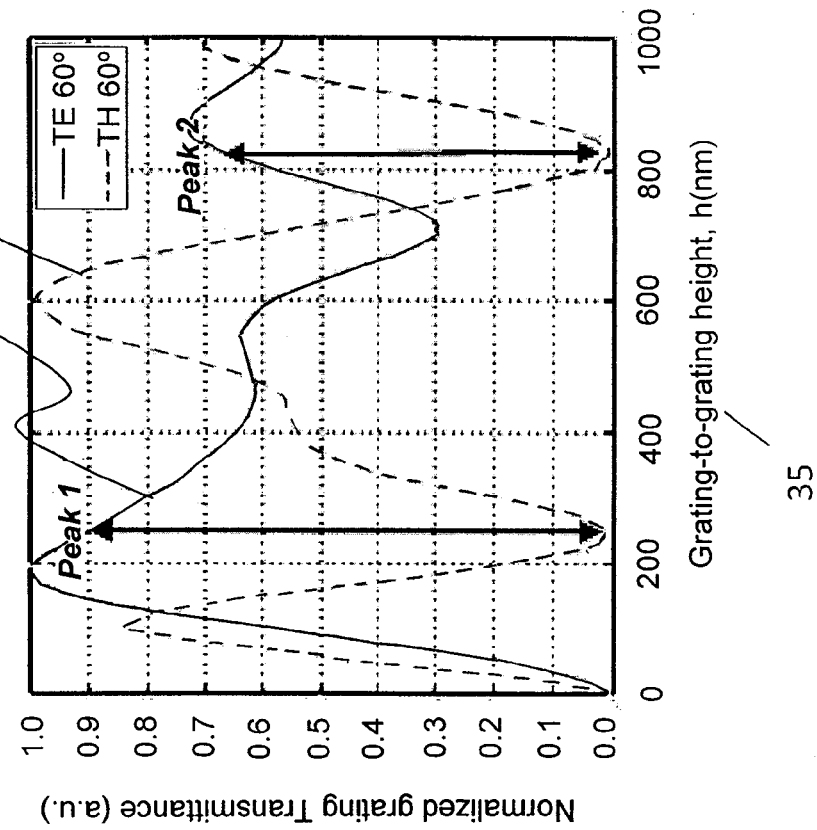
FIG. 3b is a graph showing the variations if TE and TM extracted from the lightguide as a function of grating height for a particular pitch and incident angle of light.

FIG. 3*b* shows the variation of TE, 36, and TM, 37, extracted from the lightguide as a function of the second grating height 35, for a particular value of pitch 31, and first grating height 34, and for a particular incident angle light in the lightguide. FIG. 3*c* shows the TE/TM ratio as a function of the height 35. At certain values of height, maxima are seen, 38*a* and 38*b* corresponding to the destructive interference.

The peaks are dependent on the refractive index of the lightguide material, the wavelength of the light in the lightguide and the range of angles in the lightguide. Which peak is used will depend on a balance on these values.

An example of this arrangement with a high TE/TM ratio with a 405 nm LED is as follows. The value of the spatial pitch of the grating 31 is 155.14 nm, the pitch of the grating 30 is 310.28 nm. The peak width 33 is 77.1 nm, the peak width 32 is 155.14 nm. The height 35 is 130.6 nm and the height 34 is 163.3 nm. It should be noted that these are only examples in a particular case, and that the invention describes the general shape of multiple gratings interacting that can be applied to a range of wavelengths, lightguide shapes and layers.

This invention should not be limited to simply two gratings. Multiple gratings that have a pitch that is an integer multiple of the smallest pitch can be combined to improve the performance of this system. In the extreme, multiple gratings can be combined to approximate a continuous curve cross section similar to a discrete Fourier cosine distribution.

Figure 4:
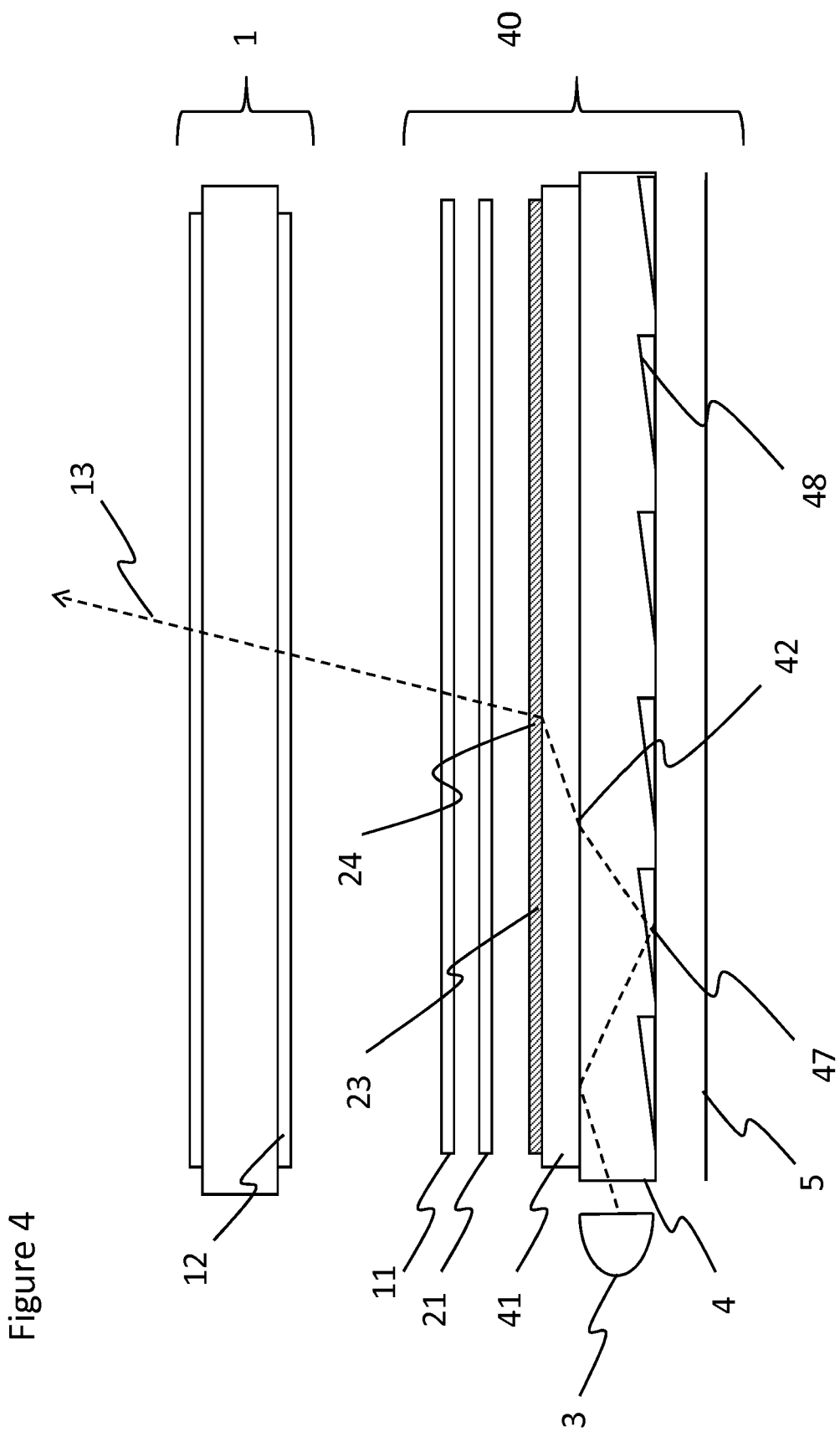
FIG. 4 illustrates a 2nd embodiment with multiple layers of different refractive index.

A second embodiment of the present invention is shown in FIG. 4. For sake of brevity, only the relevant differences between this embodiment and the embodiment of FIG. 2 are described herein.

In this aspect the lightguide 4 of the backlight 40 has a second layer 41, in which the refractive index of this layer 41 is less than that of the lightguide 4. The diffractive features 23 are placed on the second layer 41. In this arrangement the range of angles in the second layer 41 is much reduced. This means the quality of the out-coupled light is significantly improved over the single-lightguide approach.

Extraction of light at 42 from the main lightguide 4 into the secondary lightguide formed by the second layer 41 can be controlled by appropriate non-diffractive features on the opposite face of the lightguide 4, for example shallow wedge shaped features 48 that redirect at 47 a small proportion of the lightguide light 45 into the second layer 41.

The number of such additional layers is not fixed, and they can be on the lower or both surfaces of the lightguide 4 and any of the faces or interfaces can have one or more extraction arrangements.

Figure 5:
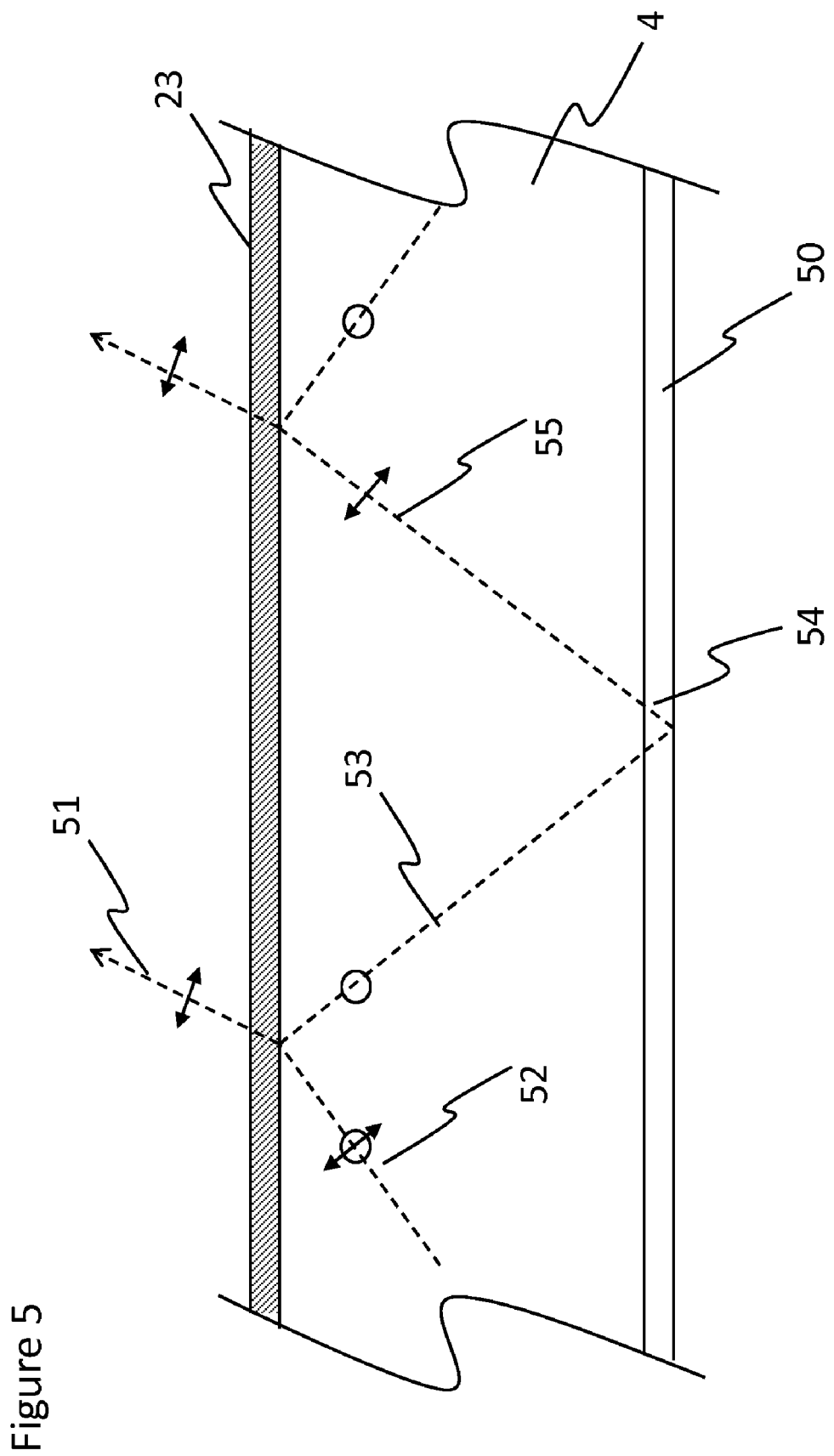
FIG. 5 illustrates a $3^{rd}$ embodiment with a quarter wave retarder layer.

In a further embodiment shown in FIG. 5, a modified lightguide arrangement is suggested. Only relevant differences over the embodiment of FIG. 2 are described herein for sake of brevity.

In the embodiment of FIG. 2, if the extraction is a significant amount of the light in the lightguide, extraction of one polarization will reduce the amount of that polarization relative to the other in the lightguide 4. Thus the assumption of non-polarized light becomes less true as TE light is extracted, the TE/TM light ratio in the lightguide 4 reduces, thus extraction TE/TM further away from the light source 3 will reduce.

To prevent this, a second layer 50 is added to the face of the lightguide 4 opposite the extraction features 23. The layer 50 is such that its does not deflect the light (so does not disrupt TIR), but affects the phase of the incident light at angles to the normal that are typical to TIR light, such that the plane of polarization after reflection has rotated by 90 degrees (a quarter wave plate layer).

Unpolarized light 52 is incident on the layer of polarized extraction features 23 that emits TE light 51 from the surface. The reflected light 53 has a relatively enhanced TM component. The light is then incident on the quarter wave plate layer 50 and totally internally reflected 54. The reflected light is rotated to the TE direction 55 so that extraction for the polarization layer will then be more efficient and maintain the polarization out-coupled. The next pass will rotate the plane of polarization back so that the light in the lightguide 4 is on average unpolarized, and the light incident on the extraction features 23 is slightly biased towards the preferential TE mode, enhancing further the extraction efficiency and TE/TM ratio.

Figure 6:
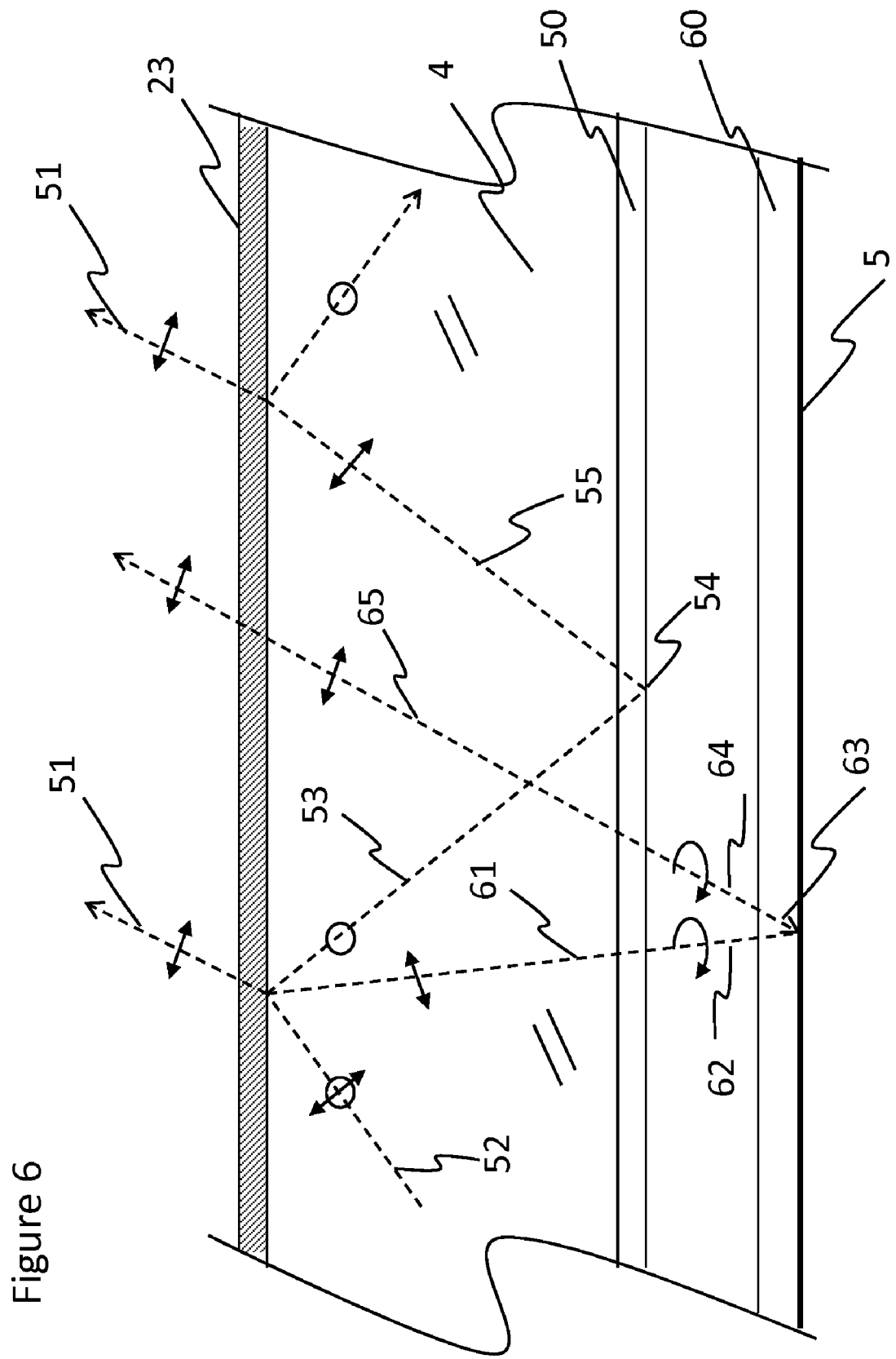
FIG. 6 illustrates a $4^{th}$ embodiment with a quarter wave layer on the reflector.

In a further embodiment as shown in FIG. 6 based on the embodiment of FIG. 5, the nature of the diffractive features is such that there may be a component of light 61, in the preferential TE mode directed back into the lightguide 4. Typically this light will be in a direction that will not be totally internally reflected by the lightguide 4 and will be extracted by reflection from the reflector 5.

In the case where the quarter wave plate layer 50 is at the bottom of the lightguide 4, the light 61 would pass through as 62 in a circular polarization state, reflected as 64 in a circular polarization state and will pass through the quarter wave plate layer 50 to produce light 65 in a TM mode. This will then be extracted. This light will reduce the final TE/TM ratio of the backlight.

This can be removed, as is shown in FIG. 6, by another quarter wave plate layer 60 positioned on the reflector 5. This layer 60 is not in optical contact with the other layer 50. The light passing through the first quarter wave plate layer 50 will be circularly polarized as 62 but corrected at 63 by the second quarter wave plate layer 60 to give a circularly rotated beam 64 that will become a TE beam 65 upon passing through the first quarter wave plate 50 again. This will then contribute to an improved TE/TM ratio for the system.

Figure 7:
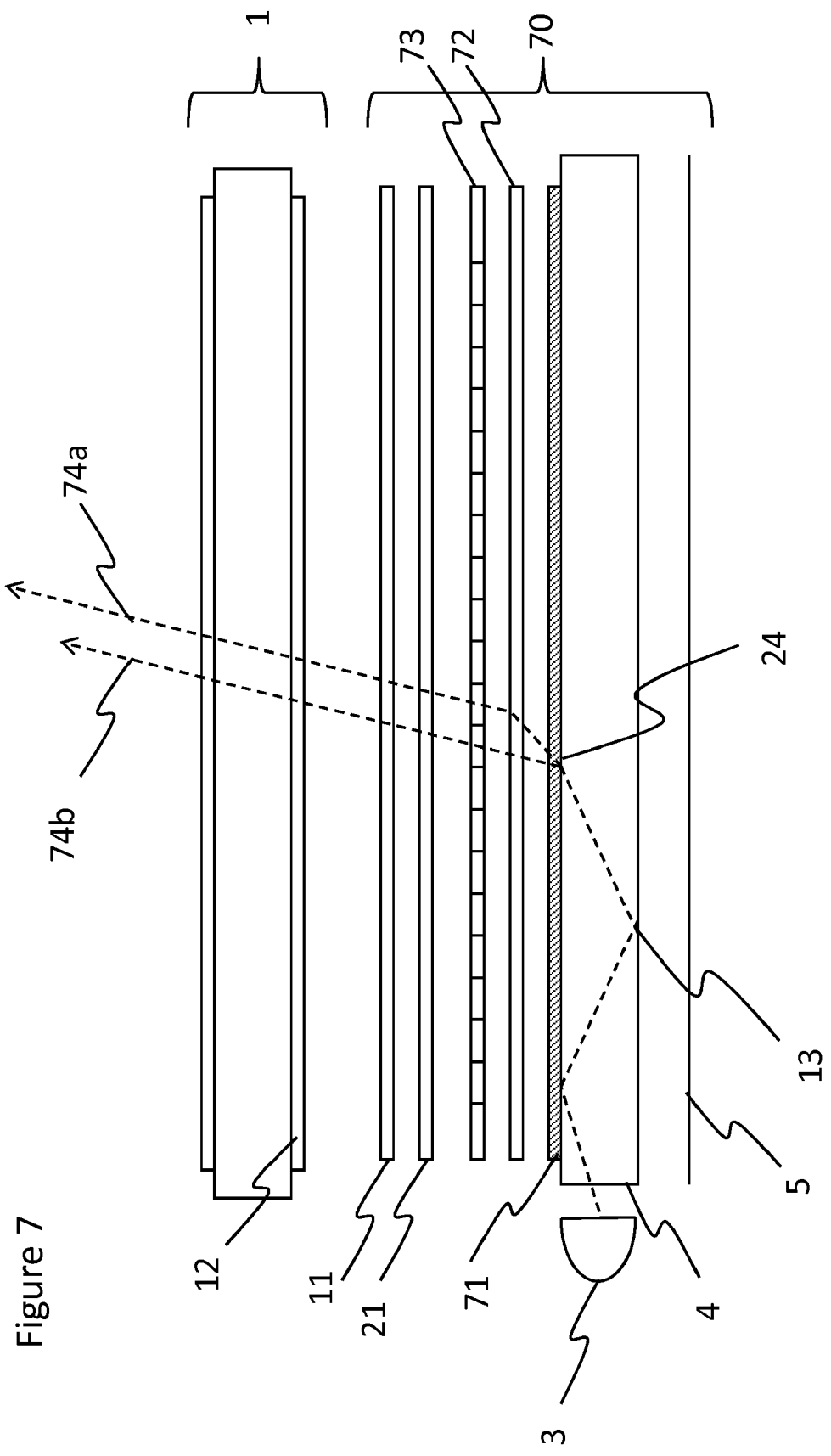
FIG. 7 illustrates a $5^{th}$ embodiment with retarder extraction features.
Figure 8:
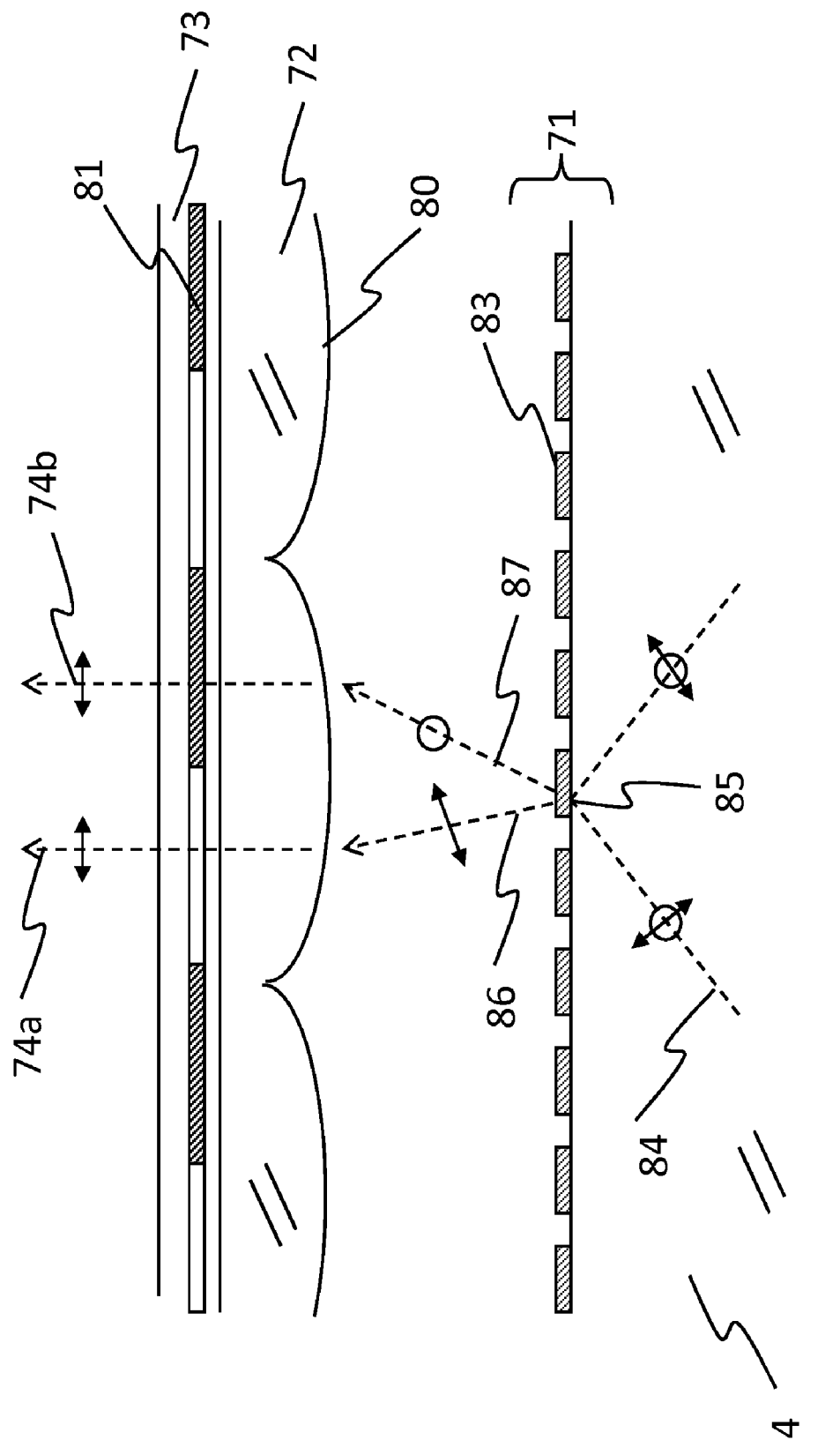
FIG. 8 is a detailed illustration of the embodiment of FIG. 7.

A further embodiment is shown in FIG. 7. A detail on this embodiment is shown in FIG. 8. This is described with reference to the embodiment of FIG. 2, but improvements of the subsequent embodiments can be applied to this embodiment. Referring only to the relevant differences, the backlight 70 in this embodiment makes use of a birefringent diffractive layer 71 on the lightguide 4 in place of the layer of extraction features 23. The birefringent diffractive layer 71 creates diffraction peaks at two angles for two different polarizations 86 and 87 from unpolarized light 84 incident on the area 85. The beams are then passed through a lens layer 72 and then a patterned retarder layer 73 which converts one of the beams into the opposite polarization state to make a polarized emission, both beams 74*a* and 74*b* are in the same polarization state.

This embodiment does not have an issue with the changing polarization state in the lightguide 4.

The birefringent layer 71 may include, for example, a lenticular square grating, patterned as described above, made up of a square array of birefringent, reactive mesogen or liquid crystal material 83. In this case "lenticular" refers to line strips perpendicular to the plane of the page and have the same cross section along the length. The lens array 72 may include lenticular lenses 80, and the retarder film 73 may include lenticular strips 81 of birefringent half wave layers that rotate the plane of polarization by 90 degrees. The retarder area can be made of the same material as that of the birefringent diffractive area.

Unpolarized light 84 in the lightguide 4 meets the diffractive structure 83. The diffractive structure may be the same structure shape as in FIG. 3a or may be a square grating where the height 35 is zero. In the case of this embodiment, the features may or may not be made of the same material as the lightguide, but would be created of a birefringent material. This means that the light 84 reaching the grating is diffracted at different angles 86 and 87 according to polarization, because the diffractive nature of the grating is dependent on the refractive index. The diffraction split will be in one plane as shown in the diagram, but in a lenticular form. A lenticular lens 72 collimates the two beams, where the separation of the lens 72 and the rating plane 71 is approximately equal to the focal length in the material separating the layers (e.g. glue or air). The collimation will be spatially split in terms of polarization, so a second layer 73 above the lens consisting of lenticular stripes of birefringent material 81, in a half-wave thickness, is aligned with the lens layer. The pitch of the stripes is the same as the lens and the width of the stripes is approximately half the pitch. One polarization is then rotated producing light emerging from the stripes, 74a and 74b with the same polarization state.

All aspects of this invention will work with a white light source, but a broad wavelength spectrum of the source would not be optimum for a single design of the extraction films.

One aspect whereby the polarization state can be improved by having a coloured source is by mixing different designs that are optimized for high TE/TM at different wavelengths with the source spectrum. For example, extraction features optimized for red, green and blue emission (for example, different values of 30, 31, 32, 33, 34, and 35) can be mixed together rather than using a single mean design.

Figure 9:
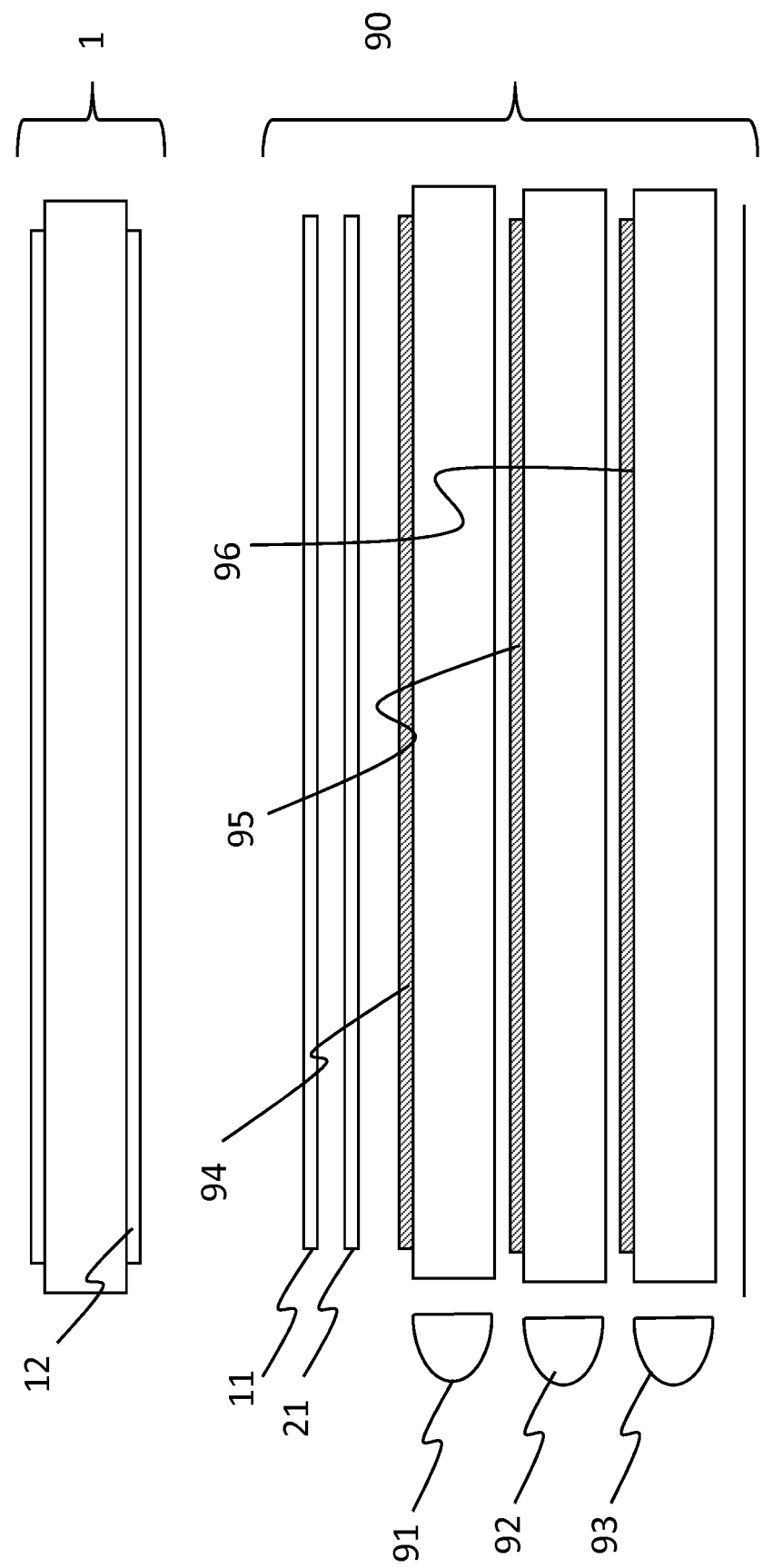
FIG. 9 illustrates a $6^{th}$ embodiment with three lightguides and three light sources of different color.

Another aspect is shown in FIG. 9 and is whereby three lightguides with three red, green, blue light sources 91, 92 and 93, and three designs of extraction features 94, 95 and 96 will produce a higher TE/TM ratio than the preferred embodiment with a single lightguide and source.

Another variation that can be applied to the embodiments described above is shown in FIG. 10. The display 100 has multiple colour phosphor layers 101 under internal polarizer structures 102 with the liquid crystal region in the SLM. In this case only one wavelength, that will excite the phosphors, is necessary for the backlight to illuminate the panel. The colour emission is made from the amount of the emitted light 22 passing through the SLM pixels to the particular phosphor. The extraction features can then be designed for this wavelength.

Another variation is shown in FIG. 11. A modified display 111 and backlight component 110 is described with reference to the embodiment of FIG. 2. This involves a choice of design of extraction features 112 in place of the extraction features 23 so that the extracted polarized light 113 is extracted normal to the lightguide surface. In this case a lens array 114 can be used to focus light through pixels 115 onto phosphor areas 116 printed on the outside of the liquid crystal cell 111. The extraction features 112 would be of the same general design as that described in the preferred embodiment and subsequent embodiments, but may have a different set of dimensions for the same materials. The phosphors then produced the colour required 103. The liquid crystal cell need not then have any colour filters and thus would improve the brightness of the system. In addition the polarizers 12 and 117 are standard polarizers, so that this design would be easier to manufacture.

The extraction features described here can be manufactured using nano-imprint techniques that are well known in the prior art.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A lightguide for distributing light received from a light source, comprising:
   a lightguide substrate having first and second major faces and an edge face there between into which light from the light source is injected, the lightguide substrate being configured to transfer the light between the first and second major faces by total internal reflection; and
   an extraction feature structure on at least one of the first and second major faces of the lightguide substrate to extract the light from the lightguide substrate, the extraction feature structure including at least a first grating interleaved with a second grating, wherein a spatial frequency of the first grating is different than that of the second grating,
   wherein the spatial frequency of the first grating is substantially twice that of the second grating.

2. The lightguide according to claim 1, wherein the extraction feature structure is configured to out-couple the light from the lightguide substrate preferentially one polarization over another.

3. The lightguide according to claim 1, wherein a feature height of the first grating is different than a feature height of the second grating.

4. The lightguide according to claim 3, wherein the feature height of the second grating alters the height of the first grating.

5. The lightguide according to claim 1, wherein a feature width of the first grating is different than a feature width of the second grating.

6. A lightguide for distributing light received from a light source, comprising:
   a lightguide substrate having first and second major faces and an edge face there between into which light from the light source is injected, the lightguide substrate being configured to transfer the light between the first and second major faces by total internal reflection; and
   an extraction feature structure on at least one of the first and second major faces of the lightguide substrate to extract the light from the lightguide substrate, the extraction feature structure including at least a first grating interleaved with a second grating, wherein a spatial frequency of the first grating is different than that of the second grating,
   wherein the first and second gratings are configured such that for a first polarization, light emitted from the first grating interferes destructively with light emitted from the second grating and is reflected back into the lightguide substrate.

7. The lightguide according to claim 6, wherein for a second polarization different from the first polarization, light emitted from the first grating does not destructively interfere with light emitted from the second grating and light of the second polarization is out-coupled from the lightguide substrate.

8. The lightguide according to claim 1, wherein the at least the first grating and the second grating interleaved consists only of the first grating and the second grating interleaved.

9. A lightguide for distributing light received from a light source, comprising:
   a lightguide substrate having first and second major faces and an edge face there between into which light from the light source is injected, the lightguide substrate being configured to transfer the light between the first and second major faces by total internal reflection; and
   an extraction feature structure on at least one of the first and second major faces of the lightguide substrate to extract the light from the lightguide substrate, the extraction feature structure including at least a first crating interleaved with a second grating, wherein a spatial frequency of the first crating is different than that of the second grating,
   the extraction feature structure further comprising at least a third grating interleaved with the first and second gratings, wherein a spatial frequency of the third grating is an integer multiple of the spatial frequency of the first grating.

10. The lightguide according to claim 1, wherein
   the lightguide structure comprises first and second layers with light from the light source being injected at the edge face into the first layer,
   the refractive index of the second layer is less than the refractive index of the first layer,
   the extraction feature structure is on the second layer, and
   the first layer comprises non-diffractive extraction features that redirect light within the first layer into the second layer.

11. The lightguide according to claim 10, wherein the lightguide structure comprises greater than two layers, with at least one of the layers including the extraction feature structure and another of the layers including the non-diffractive extraction features.

12. The lightguide according to claim 1, wherein the first major face including the extraction feature structure and the second major face includes a first quarter wave plate layer that rotates the phase of light incident thereon from within the lightguide structure without disrupting total internal reflection.

13. The lightguide according to claim 12, further comprising a second quarter wave plate layer adjacent to but not in optical contact with the first quarter wave plate layer for correcting polarization of light reflected back through the first quarter wave plate.

14. The lightguide according to claim 1, wherein the first and second gratings comprise symmetric interleaving of at least two parallel square gratings.

15. The lightguide according to claim 1, wherein the first and second gratings are lenticular.

16. The lightguide according to claim 1, wherein the first and second gratings are refractive gratings with no opaque surface areas.

17. A backlight for a display device, comprising:
   a lightguide in accordance with claim 1; and
   a light source for providing the light injected into the lightguide.

18. A backlight for a display device, comprising:
   at least three lightguides as set forth in claim 1;
   a first-colored light source associated with a first lightguide of the three light guides;
   a second-colored light source associated with a second lightguide of the three light guides; and
   a third-colored light source associated with a third lightguide of the three light guides.

19. A display device, comprising:
   a backlight in accordance with claim 17; and
   a spatial light modulator illuminated configured to be illuminated by the backlight.

* * * * *